United States Patent [19]

Stauffer

[11] 4,317,992
[45] Mar. 2, 1982

[54] OBJECT DETECTING APPARATUS

[75] Inventor: Norman L. Stauffer, Englewood, Colo.

[73] Assignee: Honeywell Inc., Minneapolis, Minn.

[21] Appl. No.: 101,602

[22] Filed: Dec. 10, 1979

[51] Int. Cl.³ .............................................. G01V 9/04
[52] U.S. Cl. ...................................... 250/221; 340/567
[58] Field of Search ............... 250/201, 204, 208, 209, 250/221, 222, 578; 354/25; 340/555, 567; 356/4, 5

[56] References Cited

U.S. PATENT DOCUMENTS

| | | |
|---|---|---|
| 3,191,048 | 6/1965 | Cowen ................................. 250/221 |
| 3,631,434 | 12/1971 | Schwartz ............................. 250/221 |
| 3,789,384 | 1/1974 | Akers ................................... 250/221 |
| 3,875,403 | 4/1975 | Svensson ............................. 250/209 |
| 4,068,222 | 1/1978 | Treviranus ......................... 250/221 |
| 4,160,904 | 7/1979 | Wilwerding ........................ 250/201 |
| 4,173,402 | 11/1979 | Horike et al. ........................... 356/4 |
| 4,185,192 | 1/1980 | Wagner ............................... 250/221 |

Primary Examiner—David C. Nelms
Attorney, Agent, or Firm—Charles J. Ungemach

[57] ABSTRACT

A passive and low cost object detector utilizing a focus module used in auto focus cameras to determine the presence of objects within the field of view of the module.

10 Claims, 4 Drawing Figures

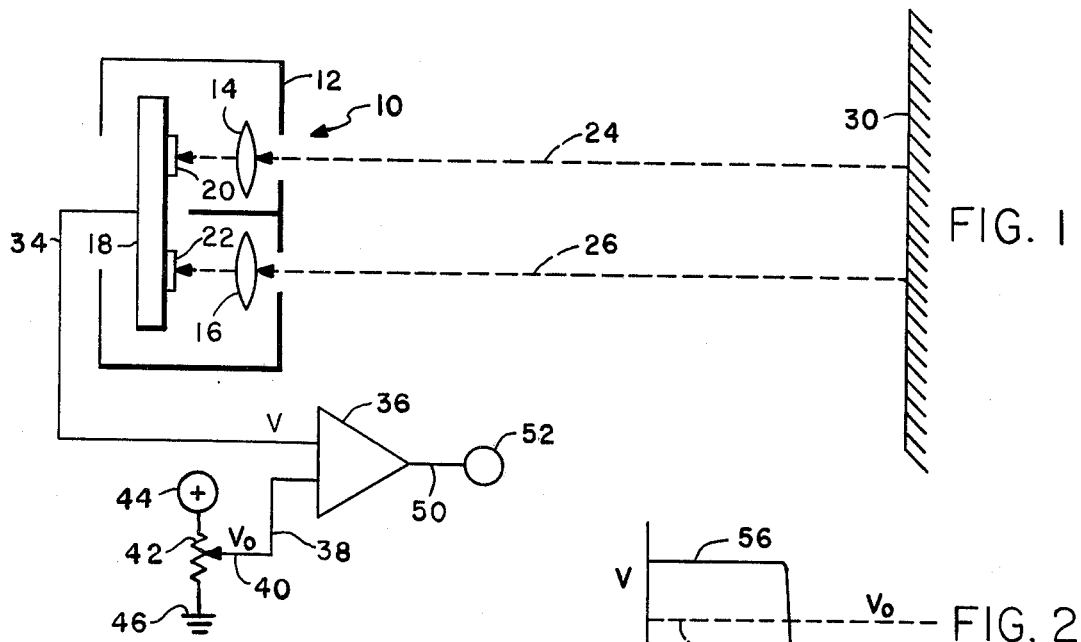
FIG. 1
FIG. 2
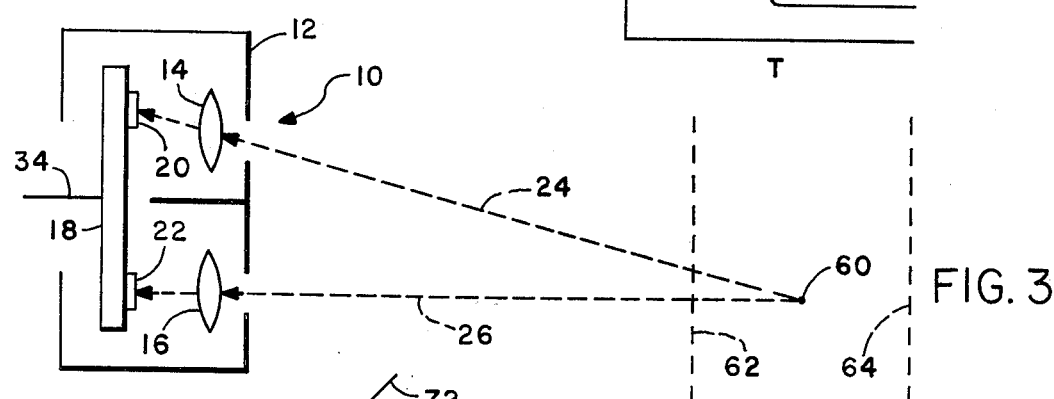
FIG. 3
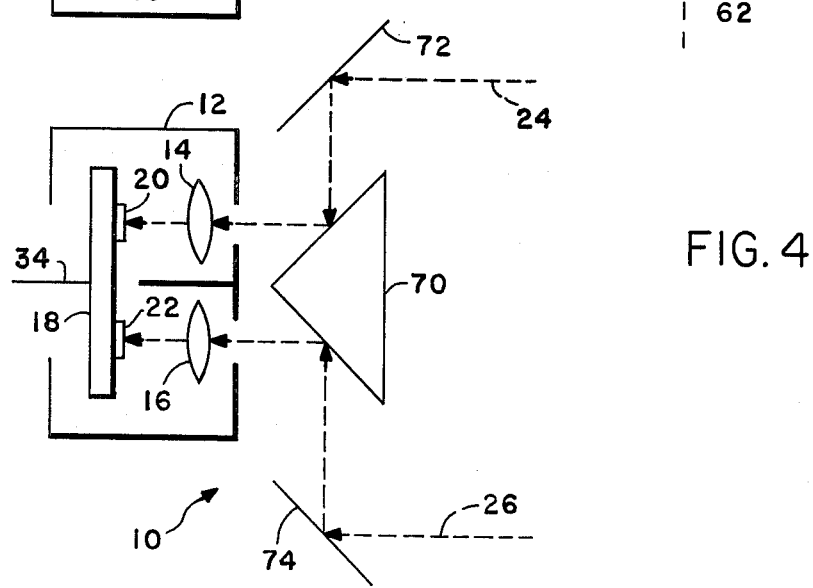
FIG. 4

OBJECT DETECTING APPARATUS

BACKGROUND OF THE INVENTION

In the art of object detection, various "active" apparatus has been proposed which, for example, detect an object by projecting a beam of light (or IR) or sound and producing an output signal when this beam is interrupted to detect the presence of an object. Such a system requires two stations, the source (or a retroreflector) and a detector with a constantly generated source of light or sound. Some passive systems have also been proposed as, for example, a television scanner and memory where the outputs of the scene being viewed by the cameras are stored in the memory and this stored memory is compared periodically with a new scan. When an object moves into the area being scanned, the signals will not match those in the stored memory and an output will be produced indicating the presence of the object. These systems are fairly complex and quite costly.

In the art of range finding, particularly in auto focus cameras, a passive auto focus "module" is known. Various examples of such modules may be seen in the Stauffer U.S. Pat. No. 4,002,899 issued Jan. 11, 1977 which modules are quite accurate and low in cost. The auto focus module receives radiation from a scene being viewed and directs this radiation along two different paths to two similarly arranged detector arrays. One of the paths is usually made angularly variable and may cross the other path at various distances from the camera. When an object in the scene is located at the intersection of the two paths, then the radiation received by two detector arrays will be substantially equal and an in-focus condition is known to exist. On the other hand, when the object to be focussed upon is not at the intersection of the paths, the outputs of the detector arrays will be unmatched and an out-of-focus condition exists. By use of electronics disclosed in the above-mentioned U.S. Pat. No. 4,002,899, a correlation signal is obtained from the detector arrays and this correlation signal changes from a high level to a low level, or vice versa, as the ouputs of the detector arrays change from a matched to an unmatched condition. As used herein, the term "module" is intended to refer to the type of unit described above, that is, to a unit in which a pair of detector arrays receives radiation over a pair of radiation transmission paths from a scene being viewed and in which an output signal is produced that changes from a high state to a low state or vice versa when an object in the scene being viewed moves from a first range where the output of the detectors is substantially matched to a second range where the outputs of the detectors are unmatched.

SUMMARY OF THE INVENTION

The present invention utilizes a module to provide a passive object detection system. The module is mounted so as to receive radiation from a scene in which the presence of objects is to be detected. The module may be "focussed" at infinity in which case objects located at a remote distance will not be detected but objects which are located relatively close to the module will upset the balance of the detectors and produce an output signal. Alternately, the module may be focussed at a particular range less than infinity in which case objects located in the scene at or near that range will not be detected but objects located in the scene closer to or further from the module will cause an output signal to occur.

BRIEF DESCRIPTION OF THE DRAWINGS

FIG. 1 is a schematic diagram of one embodiment of the present invention with the module focussed at infinity;

FIG. 2 is a graph of the output voltage as a function of time during which an object moves into the scene;

FIG. 3 is a schematic diagram of the embodiment of FIG. 1 with the module focussed at a distance other than infinity; and FIG. 4 is an alternate embodiment of the present invention wherein the module has a larger baseline.

DESCRIPTION OF THE PREFERRED EMBODIMENTS

Referring to FIG. 1, a module 10 is shown which may be like one of the modules found in the above-referred to U.S. Pat. No. 4,002,899. The module consists of a housing 12 with a pair of lenses 14 and 16 mounted therein. An integrated circuit substrate 18 is also mounted within the housing 12 and carries a pair of radiation sensitive detector patterns 20 and 22 respectively. Lenses 14 and 16 direct radiation from a scene being viewed to the right of module 10 over paths such as dashed lines 24 and 26 respectively. In FIG. 1, the lines 24 and 26 are shown to be parallel and eminating from a remote wall 30. Radiation from wall 30 therefore passes along paths 24 and 26 to lenses 14 and 16 where it is directed to detector arrays 20 and 22 respectively. If wall 30 is a plane unmarked wall, the radiation received by detector arrays 20 and 22 will be substantially equal but if an object moves between module 10 and wall 30, the amount of radiation received by the two detector patterns 20 and 22 will change since the object is not at infinity. The circuitry which is included on the substrate 18 operates on the signals from the detector arrays 20 and 22 to produce a correlation signal V as discussed in the above-mentioned U.S. Pat. No. 4,002,899. The circuitry may either operate to cause the signal V to be at a low or high value when the outputs of the detectors are matched but in the preferred embodiment, the signal V will be high at a focussed condition where the outputs of the detectors are matched and will be low at a nonfocussed condition where the outputs are mismatched. A line 34 is shown in FIG. 1 connected to the integrated circuit chip 18 and carries the output correlation signal V from the circuit chip to one input terminal of a comparator 36 having its other input connected by a line 38 to a voltage source such as a potentiometer wiper 40 movable along a resistor 42 which is connected between a positive source of voltage 44 and ground at 46. The signal, $V_0$, appearing on potentiometer wiper 40 is compared in the comparator 36 with the voltage V from the module 10 and an output signal on a line 50 indicative of the presence of an object is presented to a utilization device 52 which may be an indicator, alarm, counter or other device useful in an object detector.

Referring to FIG. 2, the output voltage V is shown plotted as a function of time by a curve 56 which, at the left hand of FIG. 2, is at a relatively high value indicating that the outputs of the detector arrays 20 and 22 are substantially matched and which, at the right hand of FIG. 2, drops to a low value indicating that the outputs of the detector arrays 20 and 22 are not matched and thereby showing the presence of an object in the area between module 10 and wall 30 of FIG. 1. The voltage $V_0$ is shown as a dashed line 58 in FIG. 2 extending about half way between the high and low values of the output voltage V on curve 56. In FIG. 1 comparator 36 may operate to produce a zero signal on line 50 whenever the voltage V is greater than the voltage $V_0$ but to produce an output signal whenever voltage V falls below $V_0$.

As can be seen in FIG. 1, the module 10 can passively sit and watch the scene between itself and wall 30 and operate to produce a signal only when an object moves between them. Of course, as would frequently occur in outdoor situations, the presence of wall 30 is not necessary since the module may be focussed at infinity regardless of the presence of the wall but for interior use, a wall is usually present.

In the event that the scene being viewed has a definite pattern as, for example, if wall 30 in FIG. 1 were to have designs thereupon, or the scene contains other high frequency components, the output of module 10 in FIG. 1 would show an unfocussed condition in which event other objects moving into the area might not be detected. To overcome this problem, the auto focus module 10 may be focussed at a particular point in space so as to produce a balanced signal for objects near that range. For example, in FIG. 3, the module 10 is again shown having lenses 14 and 16 directing radiation over paths 24 and 26 to a pair of detectors 20 and 22 but in FIG. 3, lens 14, for example, has been moved so that the paths 24 and 26 now cross at a remote point 60. Objects which are located near point 60 as, for example, between dashed lines 62 and 64 will be in focus so that detectors 20 and 22 will be receiving substantially the same amounts of radiation and the output signal V on line 34 will be in its high state. If an object were to move between module 10 and the distance defined by dashed line 62, then the outputs of detectors 20 and 22 would change so that the signal V on line 34 would drop to its low state. Apparatus of FIG. 3 could be used for example to count automobiles passing along a road which exists between module 10 and distance 62 and ignore people or other objects on the far side of the road in between distances 62 and 64. Of course, it should be understood that whereas described above, the system becomes unbalanced when objects move between the module and a remote distance the opposite effect could be used. For example, in FIG. 3, the system may again be set up so that it was in focus at point 60. If no object existed at that point, the system would be unbalanced since the radiation received by detectors 20 and 22 would not be matched. Thereafter, should an object move between distances 62 and 64, detectors 20 and 22 would now receive substantially equal amounts of radiation from the object and the system would be in focus indicating the presence of an object between the two distances 62 and 64. To utilize such a signal, the comparator 36 would only have to be reversed so that it produced an output signal when the signal V indicated an in focus condition.

It is seen in FIG. 3 that the baseline for triangulation and range determination is the distance between lenses 14 and 16. If it is desired to provide for greater accuracy, the apparatus of FIG. 4 may be used. In FIG. 4, a reflecting prism 70 and a pair of mirrors 72 and 74 are shown for directing radiation to the detector arrays 20 and 22. As before, radiation will pass along paths 24 and 26 but will now be reflected off of mirrors 72 and 74 and prism 70 respectively before entering module 10 and passing through lenses 14 and 16 to the detector arrays 20 and 22 respectively. It is seen that the baseline for triangulation is now increased to the distance between the centers of mirrors 72 and 74. One of the mirrors 72 or 74 may be made rotatable as is discussed in the above-referred to U.S. Pat. No. 4,002,899 so as to make paths 24 and 26 cross at any predetermined range desired.

It is therefore seen that I have provided an object detection system which is passive in nature and is of low cost. Many obvious modifications and changes to the embodiments disclosed in connection with the preferred embodiments will occur to those skilled in the art and I do not wish to be limited to the specific disclosure used herein. I intend only to be limited by the following claims.

The embodiments of the invention in which an exclusive property or right is claimed are defined as follows:

1. An object detector comprising:
   a module fixedly positioned to receive visible radiation which exists normally in a predetermined scene, the module being set to be focussed at a first distance so as normally to produce an output signal having a first characteristic, the output signal changing from the first characteristic to a second characteristic when an intruding object which reflects the normally existing radiation enters the scene at other than the first distance; and
   comparing means connected to the module to receive the output signal and operable to detect the change from the first characteristic to the second characteristic and to produce a resultant signal indicative of the presence of the intruding object.

2. Apparatus according to claim 1 wherein the first characteristic is a magnitude greater than a predetermined magnitude and said second characteristic is a magnitude less than the predetermined magnitude.

3. Apparatus according to claim 2 further including reference signal means operable to produce a signal of the predetermined magnitude connected to said comparing means.

4. Apparatus according to claim 1 wherein the first distance is infinity.

5. An object detector comprising:
   a module fixedly positioned to receive normally existing visible radiation from a predetermined scene and the module being set to be focussed at a first range and operable to produce an output signal having a first characteristic upon receiving normally existing radiation reflected from objects at the first range in the scene and a second characteristic upon receiving normally existing radiation reflected from objects at a range other than the first range in the scene;
   reference signal means operable to produce a reference signal having a predetermined characteristic between the first and second characteristics; and
   comparing means connected to the module and to the reference signal means to receive the output signal and the reference signal, said comparing means comparing the characteristic of the output signal with the predetermined characteristic and operable to produce a resultant signal indicative of the characteristic of the output signal as an indication of the presence of objects in the scene located at other than the first range.

6. Apparatus according to claim 5 wherein the predetermined characteristic is a predetermined magnitude, the first characteristic is a magnitude greater than the predetermined magnitude and the second characteristic is a magnitude less than the predetermined magnitude.

7. An object detector comprising:
first radiation transmission means;
second radiation transmission means;
first radiation detection means operable to produce a first signal indicative of the radiation received thereby;
second radiation detection means operable to produce a second signal indicative of the radiation received thereby;
means mounting the first radiation transmission means and the first radiation detection means to fixedly view a predetermined scene so that normally existing visible radiation reflected from an object which may be present in the predetermined scene is directed along a first path to the first radiation transmission means and from the first radiation transmission means to the first radiation detection means;
means mounting the second radiation transmission means and the second radiation detection means to fixedly view the predetermined scene so that the normally existing visible radiation reflected from the object is directed along a second path to the second radiation transmission means and from the second radiation transmission means to the second radiation detection means, the first signal and first and second radiation transmission means being focussed at a first range so that the second signal being matched when an object is at the first range and being unmatched when an object is at a first range other than the first range;
signal processing means connected to the first and second radiation detection means to receive the first and second signals and operable to produce an output signal having a first magnitude when the first and second signals are matched and a second magnitude when the first and second signals are not matched; and
comparator means connected to the signal processing means and operable to produce a resultant signal indicative of the magnitude of the output signal as an indication of the presence of the object in the scene at other than the first range.

8. Apparatus according to claim 7 wherein the resultant signal is zero when the object is in the scene and a non-zero value when the object is not in the scene.

9. Apparatus according to claim 7 wherein the resultant signal is zero when the object is not in the scene and a non-zero value when the object is in the scene.

10. Apparatus according to claim 7 wherein the first and second radiation transmission means are lenses and the first and second radiation detection means are similar arrays of radiation detectors.

* * * * *